United States Patent Office 3,313,491
Patented Apr. 11, 1967

3,313,491
PROCESS FOR THE PREPARATION OF QUINACRIDONE IN THE FORM OF A PIGMENT
Tommaso Lucchini, Cesano Maderno, Milan, and Giacomo Barlaro, Seregno, Milan, Italy, assignors to Aziende Colori Nazionali Affini ACNA S.p.A., Milan, Italy
No Drawing. Filed Nov. 8, 1963, Ser. No. 322,513
Claims priority, application Italy, Nov. 12, 1962, 22,242/62
10 Claims. (Cl. 241—16)

This invention is directed to a process for the preparation of quinacridone in the form of a pigment. More specifically this invention is directed to the preparation of quinacridone in the form of a pigment by milling the compound in the presence of an effective amount of a synthetic resin in an aqueous medium. Still more specifically, the pigment is prepared by milling the compound in an aqueous medium having a viscosity ranging from about 2–30 centipoises.

Linear quinacridone as characterized by Formula I

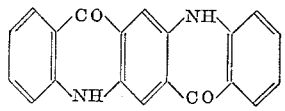

can be prepared according to the process of Liebermann (A, 518, 1933, pages 245–259). This compound is particularly characterized as being stable to chemicals and physical abuse which makes the compound potentially valuable for the preparation of pigments. The value of using this compound in the preparation of red or red-violet pigments is already known. However, its practical use is hindered by the fact that the compound cannot be transformed into products having a crystalline, unitary and finely-divided structure without a great amount of difficulty. The transformation of quinacridone into products having this type of structure is not only difficult, but also expensive. Nevertheless it is necessary in order to obtain intensive and uniform color shades.

Presently, the transformation of quinacridone into a crystalline form is accomplished by dry-milling the compound with an inorganic salt. In some instances, the dry-milling may take place in the presence of an additive which directs the formation to one of the three known crystalline forms, i.e. alpha, beta and gamma. This method, however, is inconvenient and costly in that it requires a large amount of the inorganic salt and long periods of milling. In addition to the increased cost, the production yield is very low. Other methods involve the preparation of a solution of the pigment which is subsequently precipitated. These methods are costly also in that they require the use of costly raw materials such as polyphosphoric acid, aluminum chloride, alcoholic potassium hydroxide, etc., and for the most part do not give products fine enough for any practical use.

In addition to the above methods, other kinds of dyestuffs which are insoluble in water have been milled by vigorously stirring an aqueous suspension of the dye in combination with plastic materials. This particular method, however, has not proven satisfactory when used with quinacridone since this compound is extremely hard and requires the milling to be carried out in the presence of surfactants. In other words, if a product having a desired degree of fineness is to be obtained the milling must take place with the presence of a surfactant. It is necessary, however, to remove these surfactants in order to obtain a pigment having the desired characteristics. The removal of the surfactant has been found to be very difficult due to the high degree of dispersion of the pigment in the aqueous phase.

It has now been discovered, quite unexpectedly, that it is possible to obtain quinacridone in the form of a pigment by milling the compound in an aqueous medium in the presence of an effective amount of a synthetic resin in the form of little spheres. More specifically, it has been discovered that the milling can take place without the use of surfactants provided that a viscosity or thickening agent is used to bring the viscosity of the aqueous medium to a point ranging between 2 and 30 centipoises. There are many compounds which are known to thicken or improve the viscosity of aqueous systems. However, for purposes of this invention only those agents can be used which do not posses dispersing activity, since such dispersing action makes it difficult to remove them from suspension.

Accordingly, it has been found that quinacridone can be obtained in the form of a pigment by milling the compound in an aqueous medium in the presence of a synthetic resin spheres and with the use of hydroxy-containing thickening agents. The viscosity or thickening agents to be used for purposes of this invention include at least one polyhydroxy compound such as, for example, dipropylene glycol, tripropylene glycol, glycerine, polyethylene glycol having a molecular weight of about 400 and other known compounds.

The size of the synthetic resin pellets or spheres used as the milling agents may vary according to the type of mechanical stirring employed. It is preferred, however, that the size of the pellets vary from about 0.2 to 1 mm. and the amount be sufficient to adequately mill the product. The resins to be used for the pellets of this invention include polymethylmethacrylate, copolymers of polyvinylchloride, copolymers of styrene, copolymers of divinylbenzene - acrylonitrile-methylacrylate, polyethylene resins, polypropylene resins, epoxy resins, polyvinyl resins, polystyrene resins, etc. In addition to these, it is obvious that other synthetic resins characterized by having a high degree of hardness and a sufficient degree of elasticity may be used. These characteristics are important in order to keep the resin spheres from being chipped or minced during the milling operation due to shock caused by the moving and fixed parts of the apparatus. The hardness of the resin has to be maintained in cold aqueous suspensions ranging up to temperatures of about 45–50° C. In addition the resin must maintain a good resistance to water or have hydrophobic characteristics.

The relative proportions of the components in the suspension comprising the pigment, milling agent, viscosity or thickening agent and water may vary within wide limits depending upon the product desired, the size of the milling pellets and the viscosity that the mass is to assume during the milling operation. The milling takes place in a vessel provided with vigorous stirring action which causes shock between the particles of pigment and the milling agent. The operation may be carried out in a bath or in a continuous manner in any known suitable apparatus. The duration of milling depends on the initial size of the crystals and on the degree of fineness desired of the final product.

Generally, however, the milling operation may last as long as four hours after which time none of the particles of pigment can be detected, by microscope examination, to have a size greater than 0.5 micron. The milled mass is subsequently passed through a 15,000 standard mesh sieve to remove the plastic pellets which can then be recycled. The sieved mass is filtered to obtain the pigment in the form of a cake. The filtrate containing the thickening agent, can be recycled as such or can be concentrated and then recycled. The pigment is washed and dried and if need be further milled in accordance with the method described above. By working or milling the pigment, a product can be obtained which has very good dyeing characteristics in all of its applications. The crystalline pattern of the product is the same as the starting material except that the size of the crystals have been made smaller.

One of the important advantages of this invention resides in the fact that there is essentially no consumption of raw materials, since both the milling agent and the additives are continuously recycled. In addition, the process provides high yields due to the high milling rate.

The following example is for the purpose of illustrating the invention.

EXAMPLE 1

Approximately twenty parts by weight of quinacridone in the alpha form were used to prepare a 10.8% aqueous paste. The paste was prepared by dissolving the quinacridone in sulfuric acid which was then poured into the water. Approximately 184 parts by weight of this aqueous paste was introduced into a vessel provided with an agitator for vigorous stirring. Subsequently, 279 parts by weight of dipropylene glycol and 115 parts by weight of water were added to the vessel. The viscosity of the aqueous phase reached by 7.5 centipoises at 25° C. Approximately 300 parts by weight of polymethylmethacrylate in the form of pellets having a diameter of 0.1–0.4 mm. were introduced into the vessel. Vigorous stirring was maintained while a cooling bath maintained the temperature of the mass to a temperature not exceeding 30° C. After the mass was agitated for approximately four hours, it was passed through a 15,000 mesh screen.

The polymethylmethacrylate pellets were separated and used in the succeeding operation. The sludge was filtered and the pigment was separated in the form of a cake which was then washed with water until the glycol was completely removed. The glycol-containing fluid was concentrated and recycled. The cake was washed with methanol and dried at a temperature of 60° C. or higher. The pigment obtained was quinacridone in the alpha form. The dyeing characteristics and dispersing power of the pigment were noted to be very outstanding and were particularly noted to be useful for dyeing plastic materials.

While this invention has been described with respect to specific examples, it is obvious that there are other modifications and variations which may be resorted to without departing from the true spirit of the invention, except as more specifically pointed out in the appended claims.

What is claimed is:

1. A process for preparing quinacridone in the form of a pigment which comprises milling quinacridone in an aqueous medium comprising synthetic resin pellets and at least one polyhydroxy-containing thickening agent, said agent maintaining the viscosity of the aqueous medium within a range of about 2 to 30 centipoises, and continuing said milling until said quinacridone pigment has a particle size of not greater than about 0.5 micron as determined by microscopic examination.

2. The process of claim 1 wherein, the synthetic resin pellets are polymethylmethacrylate.

3. The process of claim 1 wherein, the synthetic resin pellets are polystyrene.

4. The process of claim 1 wherein, the synthetic resin pellets are polyethylene.

5. The process of claim 1 wherein, the polyhydroxy-containing thickening agent is dipropylene glycol.

6. The process of claim 1 wherein, the polyhydroxy-containing thickening agent is tripropylene glycol.

7. The process of claim 1 wherein, the polyhydroxy-containing thickening agent is polyethylene glycol having an average molecular weight of about 400.

8. The process of claim 1 wherein, the polyhydroxy-containing thickening agent is glycerine.

9. The process of claim 1 wherein subsequent to milling, the aqueous medium is passed through a sieve which retains the synthetic resin pellets and filtered thereby providing for recycling the pellets and the polyhydroxy-containing thickening agent.

10. The process of claim 1 wherein said synthetic resin pellets have a diameter of about 0.2 to 1 mm.

References Cited by the Examiner

UNITED STATES PATENTS

| 2,556,726 | 6/1951 | Lane | 260—314.5 |
| 2,556,727 | 6/1951 | Lane et al. | 260—316.5 |
| 2,982,666 | 5/1961 | Chun et al. | |
| 3,127,412 | 3/1964 | Gaertner | 260—279 |

ALEX MAZEL, *Primary Examiner.*

HENRY R. JILES, *Examiner.*

D. G. DAUS, *Assistant Examiner.*